US006991302B2

(12) United States Patent
Nilsson et al.

(10) Patent No.: US 6,991,302 B2
(45) Date of Patent: Jan. 31, 2006

(54) BRAKE SYSTEM WITH DISTRIBUTED ELECTRONIC CONTROL UNITS

(75) Inventors: Peter Nilsson, Örkelljunga (SE); Anders Lindqvist, Landkrona (SE)

(73) Assignee: Haldex Brake Products AB, (DE)

( * ) Notice: Subject to any disclaimer, the term of this patent is extended or adjusted under 35 U.S.C. 154(b) by 0 days.

(21) Appl. No.: 10/672,806

(22) Filed: Sep. 26, 2003

(65) Prior Publication Data

US 2005/0067886 A1 Mar. 31, 2005

(51) Int. Cl.
*B60T 13/72* (2006.01)
*B60T 15/14* (2006.01)

(52) U.S. Cl. ........................................................ 303/20
(58) Field of Classification Search .................. 303/20, 303/15, 199, 72, 96
See application file for complete search history.

(56) References Cited

U.S. PATENT DOCUMENTS

| | | | | |
|---|---|---|---|---|
| 4,653,614 A | | 3/1987 | Price et al. ..................... 188/70 |
| 4,852,699 A | | 8/1989 | Karnopp et al. ............ 188/72.2 |
| 4,946,007 A | | 8/1990 | Pederson et al. ......... 188/24.14 |
| 4,974,704 A | | 12/1990 | Miller et al. ............. 188/24.24 |
| 5,012,901 A | | 5/1991 | Campbell et al. .......... 188/71.4 |
| 5,255,962 A | * | 10/1993 | Neuhaus et al. ............. 303/188 |
| 5,288,139 A | * | 2/1994 | Singleton et al. .............. 303/15 |
| 5,303,348 A | * | 4/1994 | Botzenhardt et al. ........ 710/114 |
| 5,788,023 A | | 8/1998 | Schoner et al. ............ 188/72.7 |
| 5,829,557 A | | 11/1998 | Halasy-Wimmer et al. . 188/162 |
| 5,957,551 A | * | 9/1999 | Maron et al. ................ 303/191 |
| 6,189,981 B1 | * | 2/2001 | Niedermeier ................ 303/20 |
| 6,209,966 B1 | | 4/2001 | Mies |
| 6,213,567 B1 | * | 4/2001 | Zittlau et al. .................. 303/20 |
| 6,296,325 B1 | * | 10/2001 | Corio et al. .................... 303/20 |
| 6,318,513 B1 | | 11/2001 | Dietrich et al. ............ 188/72.7 |
| 6,354,671 B1 | | 3/2002 | Feldmann et al. ............. 303/15 |
| 6,412,880 B1 | * | 7/2002 | Knechtges et al. ............ 303/20 |
| 6,525,432 B2 | * | 2/2003 | Heckmann et al. ........ 307/10.1 |
| 2002/0035428 A1 | | 3/2002 | Baeuerle ...................... 701/114 |

FOREIGN PATENT DOCUMENTS

| | | |
|---|---|---|
| EP | 86201628.4 | 9/1986 |
| EP | 0486818 | 5/1992 |
| EP | 0555532 | 8/1993 |
| EP | DE4214644 | 11/1993 |
| EP | DE10243914 | 5/2003 |
| WO | WO 03071150 | 8/2003 |

* cited by examiner

*Primary Examiner*—Robert A. Siconolfi
(74) *Attorney, Agent, or Firm*—St. Onge Steward Johnston & Reens LLC

(57) ABSTRACT

An electronically controlled braking system includes at least one central control unit operable to assign identifiers during an identifier assignment routine, a first distributed electronic control unit, a second distributed electronic control unit and a control network electrically connecting the at least one control unit, the first distributed electronic control unit and the second distributed electronic control unit. The identifiers include a first identifier and a second identifier, with one of the first identifier or the second identifier being assigned to the first distributed electronic control unit and the other of the first identifier or the second identifier being assigned to the second distributed electronic control unit at least in part based upon the timing of a signal reaching, via the control network, the first distributed electronic control unit and the second distributed electronic control unit.

34 Claims, 3 Drawing Sheets

BRAKE SYSTEM WITH DISTRIBUTED ELECTRONIC CONTROL UNITS

FIELD OF THE INVENTION

The present invention relates generally to an electronically controlled braking system which is intended for use with wheeled vehicles, and more particularly to a such a braking system which incorporates distributed electronic control units.

BACKGROUND OF THE INVENTION

Traditional braking systems for motor vehicles include conventional hydraulic or pneumatic brakes associated with two or more wheels of the vehicle. Such conventional brakes are actuated by pressurized fluid or compressed air. When actuated, the brakes exert a force on a disk or drum which spins in conjunction with the wheel of the vehicle in order to create frictional forces which resist rotation of the wheel. Traditionally, control signals have been transmitted to each of the brake system's actuators mechanically, or by a hydraulic or pneumatic control circuit. However, it has more recently been proposed to employ a centralized control unit to generate electronic control signals and to use such electronic control signals to control actuation of a vehicle's brakes. This type of electronic control scheme has become even more prevalent in view of modern brake systems which now often include not only conventional hydraulic or pneumatic brake actuator functionality, but also supplemental electronic functions such as antilock protection (ABS) and/or electronic braking force distribution (EBV) between the front and rear axles.

In some brake systems employing electronic control, it is known to employ distributed electronic control units to receive electronic control signals from the central control unit and to control the actuation of brake components in response thereto. Such distributed electronic control units may be associated with each individual brake component and/or may be associated with two or more brake components (for example, one distributed electronic control unit may be associated with both brake actuators on a single axle). In either case, the central control unit generates and transmits electronic control signals to each of the distributed electronic control units via one or more control networks, and the distributed electronic control units, in response to such electronic control signals, cause the brake component(s) with which they are associated to actuate. Such a system, however, suffers from a number of disadvantages. One disadvantage of such a system is that all brake components must be responsive to a single control signal, as there is no way for control signals intended for controlling only one brake component or group of brake components to be differentiated from those control signals intended for controlling another brake component or group of brake components.

This disadvantage is obviated by certain brake systems which employ a scheme for the recognition of the physical position of each individual brake component or each group of brake components. Known schemes of this type generally involve the manual programming or setting of a unique identifier in the memory of each distributed electronic control unit, which identifier is indicative of the physical position of the brake component or group of brake components with which the distributed electronic control unit is associated. In these systems, each of the control signals generated by the central control unit includes an indication of the identifier of the distributed control unit for which that control signal is intended. When each distributed electronic control unit receives the control signals, it determines, based upon the identifier contained in each control signal, whether that particular control signal is intended for it, and if so, responds accordingly. If that particular control signal is not intended for it, the control signal is ignored.

For example, the distributed electronic control unit associated with a brake component on the right front wheel of a vehicle may be programmed with an identifier indicative of such a position. Thus, when control signals are received from the central control unit, the distributed electronic control unit associated with a brake component on the right front wheel of the vehicle responds to the control signal only if that control signal includes the appropriate identifier (if not, the control signal is ignored). Distributed electronic control units associated with groups of brake components (e.g., the brake components on a vehicle axle) may be similarly programmed and controlled.

While the above-described control scheme allows each individual brake component or each group of brake components to be independently controlled by the central control unit, it does still suffer from a number of disadvantages. More specifically, the manual programming or setting of the unique identifier in the memory of each distributed electronic control unit may create compatibility problems, which may lead the brake system to operate inefficiently or even fail completely. This is true because each time a distributed electronic control unit is replaced and/or its location in the system is changed, the distributed electronic control unit must be manually programmed or reprogrammed. For example, if a brake component including a distributed electronic control unit failed and was replaced, the new brake component must be programmed with the identifier appropriate for its location. If the service technician overlooks such programming or programs the distributed electronic control unit incorrectly, that brake component may not respond at all, or may respond at inappropriate times.

A similar problem may occur if the locations of two or more brake components are switched. For example, if the left front and right front brake components are switched during servicing and not reprogrammed, the control signals generated by the central control unit intended to control the left front brake component would actually be controlling the right front brake component, while the control signals intended to control the right front brake component would actually be controlling the left front brake component. This could cause a hazardous condition during vehicle operation. Moreover, even if programming and/or reprogramming is carried out correctly, the process may be time-consuming and would likely require additional knowledge on the part of service technicians who service the brake system.

What is desired, therefore, is an electronically controlled braking system intended for use with wheeled vehicles which incorporates distributed electronic control units, which allows for the control of each individual brake component or each group of brake components associated with each distributed electronic control unit independently of those associated with other distributed electronic control units, which allows for control signals intended for controlling only one brake component or group of brake components to be differentiated from those control signals intended for controlling another brake component or group of brake components, which does not require that the distributed electronic control unit be manually programmed or reprogrammed each time a distributed electronic control unit is replaced and/or its location in the system is changed, and which employs an identification scheme, the implementation of which is not time-consuming and/or does not require additional knowledge on the part of service technicians who service the brake system.

SUMMARY OF THE INVENTION

Accordingly, it is an object of the present invention to provide an electronically controlled braking system intended for use with wheeled vehicles which incorporates distributed electronic control units.

Another object of the present invention is to provide an electronically controlled braking system having the above characteristics and which allows for the control of each individual brake component or each group of brake components associated with each distributed electronic control unit independently of those associated with other distributed electronic control units.

A further object of the present invention is to provide an electronically controlled braking system having the above characteristics and which allows for control signals intended for controlling only one brake component or group of brake components to be differentiated from those control signals intended for controlling another brake component or group of brake components.

Still another object of the present invention is to provide an electronically controlled braking system having the above characteristics and which does not require that the distributed electronic control unit be manually programmed or reprogrammed each time a distributed electronic control unit is replaced and/or its location in the system is changed.

Yet a further object of the present invention is to provide an electronically controlled braking system having the above characteristics and which employs an identification scheme, the implementation of which is not time-consuming and/or does not require additional knowledge on the part of service technicians who service the brake system.

These and other objects of the present invention are achieved in one embodiment by provision of an electronically controlled braking system including at least one central control unit operable to assign identifiers during an identifier assignment routine, a first distributed electronic control unit, a second distributed electronic control unit and a control network electrically connecting the at least one control unit, the first distributed electronic control unit and the second distributed electronic control unit. The identifiers include a first identifier and a second identifier, with one of the first identifier or the second identifier being assigned to the first distributed electronic control unit and the other of the first identifier or the second identifier being assigned to the second distributed electronic control unit at least in part based upon the timing of a signal reaching, via the control network, the first distributed electronic control unit and the second distributed electronic control unit.

In some embodiments, the control network electrically connects the at least one control unit with the first distributed electronic control unit, and the second distributed electronic control unit with the first distributed electronic control unit, and after the signal is received by the first distributed electronic control unit, the first distributed electronic control unit introduces a time delay before relaying the signal to the second distributed electronic control unit.

In some embodiments, the at least one central control unit further generates control signals during operation, each control signal including at least one identifier. The control signals are received by the first distributed electronic control unit and the second distributed electronic control unit, and each control signal is acted upon by the first distributed electronic control unit only if that control signal includes the identifier assigned to the first distributed electronic control unit and each control signal is acted upon by the second distributed electronic control unit only if that control signal includes the identifier assigned to the second distributed electronic control unit.

In some embodiments, each of the identifiers is indicative of the position of a brake component on a vehicle. In some embodiments, the identifier assignment routine is performed when a vehicle is first started. In certain embodiments, the identifier assignment routine is performed periodically or from time to time. In some embodiments, the identifier assignment routine is performed when the central control unit senses that a distributed electronic control unit has been added to or removed from the control network. In some embodiments, the first distributed electronic control unit and the second distributed electronic control unit are associated with brake components which are actuated by a force selected from the group consisting of an electrical force, a hydraulic force, a pneumatic force and combinations of these.

In another embodiment of the present invention, an electronically controlled braking system includes at least one central control unit operable to assign identifiers during an identifier assignment routine, a first pair of distributed electronic control units, a second pair of distributed electronic control units, and a control network electrically connecting the at least one control unit, the first pair of distributed electronic control units, and the second pair of distributed electronic control units. The identifiers include a first identifier, a second identifier, a third identifier and a fourth identifier, with one of the first identifier, the second identifier, the third identifier or the fourth identifier being assigned to each of the distributed electronic control units at least in part based upon the timing of a signal reaching, via the control network, each of the distributed electronic control units.

In some embodiments, the control network electrically connects the at least one control unit with the first pair of distributed electronic control units, and the second pair of distributed electronic control units with the first pair of distributed electronic control units, and after the signal is received by the first pair of distributed electronic control units, the first pair of distributed electronic control units introduces a time delay before relaying the signal to the second pair of distributed electronic control units.

In some embodiments, the signal is received by the first pair of distributed electronic control units, the first identifier is assigned to one of the first pair of distributed electronic control units and the second identifier is assigned to the other one of the first pair of distributed electronic control units, and after the time delay, the signal is received by the second pair of distributed electronic control units, and the third identifier is assigned to one of the second pair of distributed electronic control units and the fourth identifier is assigned to the other one of the second pair of distributed electronic control units. In some embodiments, the first pair of distributed electronic control units is associated with brake components disposed on a first axle of a vehicle and the second pair of distributed electronic control units is associated with brake components disposed on a second axle of the vehicle.

In some embodiments, the at least one central control unit further generates control signals during operation, each control signal including at least one identifier. The control signals are received by each of the distributed electronic control units and each control signal is acted upon by each distributed electronic control unit only if that control signal includes the identifier assigned to that distributed electronic control unit.

In some embodiments, each of the identifiers is indicative of the position of a brake component on a vehicle. In some embodiments, the identifier assignment routine is performed when a vehicle is first started. In certain embodiments, the identifier assignment routine is performed periodically or from time to time. In some embodiments, the identifier assignment routine is performed when the central control unit senses that a distributed electronic control unit has been added to or removed from the control network. In some embodiments, the first pair of distributed electronic control units and the second pair of distributed electronic control units are associated with brake components which are actuated by a force selected from the group consisting of an electrical force, a hydraulic force, a pneumatic force and combinations of these.

In another embodiment of the present invention, a method of operating an electronically controlled braking system includes the steps of transmitting a signal to a first distributed electronic control unit and a second distributed electronic control unit, and assigning one of a first identifier or a second identifier to the first distributed electronic control unit and assigning the other of the first identifier or the second identifier to the second distributed electronic control unit at least in part based upon the timing of the signal reaching the first distributed electronic control unit and the second distributed electronic control unit.

In some embodiments, the signal is transmitted to the second distributed electronic unit through the first distributed electronic control unit, and the method further includes the step of introducing a time delay in the first distributed electronic control unit before relaying the signal to the second distributed electronic control unit.

In some embodiments, the method further includes the steps of generating control signals during operation, each control signal including at least one identifier, receiving the control signals with the first distributed electronic control unit and the second distributed electronic control unit, acting upon the control signals with the first distributed electronic control unit only if that control signal includes the identifier assigned to the first distributed electronic control unit, and acting upon the control signals with the second distributed electronic control unit only if that control signal includes the identifier assigned to the second distributed electronic control unit.

In some embodiments, each of the identifiers is indicative of the position of a brake component on a vehicle. In some embodiments, the transmitting and assigning steps are performed when a vehicle is first started. In certain embodiments, the transmitting and assigning steps are performed periodically or from time to time. In some embodiments, the transmitting and assigning steps are performed when a distributed electronic control unit has been added to or removed from the braking system.

In a further embodiment of the present invention, a method of operating an electronically controlled braking system includes the steps of transmitting a signal to a first pair of distributed electronic control units and a second pair of distributed electronic control units, and assigning one of a first identifier, a second identifier, a third identifier or a fourth identifier to each of the distributed electronic control units at least in part based upon the timing of the signal reaching each of the distributed electronic control units.

In some embodiments, the signal is transmitted to the second pair of distributed electronic units through at least one of the first pair of distributed electronic control units, and the method further includes the step of introducing a time delay with the at least one of the first pair of distributed electronic control units through which the signal is transmitted before relaying the signal to the second pair of distributed electronic control units.

In some embodiments, the assigning step includes the steps of receiving the signal with the first pair of distributed electronic control units, assigning the first identifier to one of the first pair of distributed electronic control units, assigning the second identifier to the other one of the first pair of distributed electronic control units, receiving, after the time delay, the signal with the second pair of distributed electronic control units, assigning the third identifier to one of the second pair of distributed electronic control units, and assigning the fourth identifier to the other one of the second pair of distributed electronic control units.

In some embodiments, the first pair of distributed electronic control units is associated with brake components disposed on a first axle of a vehicle and the second pair of distributed electronic control units is associated with brake components disposed on a second axle of the vehicle.

In some embodiments, the method further includes the steps of generating control signals during operation, each control signal including at least one identifier, receiving the control signals with the distributed electronic control units, and acting upon each control signal only with the distributed electronic control unit or units which have been assigned an identifier which matches the at least one identifier included in the control signal.

In some embodiments, each of the identifiers is indicative of the position of a brake component on a vehicle. In some embodiments, the transmitting and assigning steps are performed when a vehicle is first started. In certain embodiments, the transmitting and assigning steps are performed periodically or from time to time. In certain embodiments, the transmitting and assigning steps are performed when a distributed electronic control unit has been added to or removed from the braking system.

The invention and its particular features and advantages will become more apparent from the following detailed description considered with reference to the accompanying drawings.

DETAILED DESCRIPTION OF AN EMBODIMENT OF THE INVENTION

Figure 1:
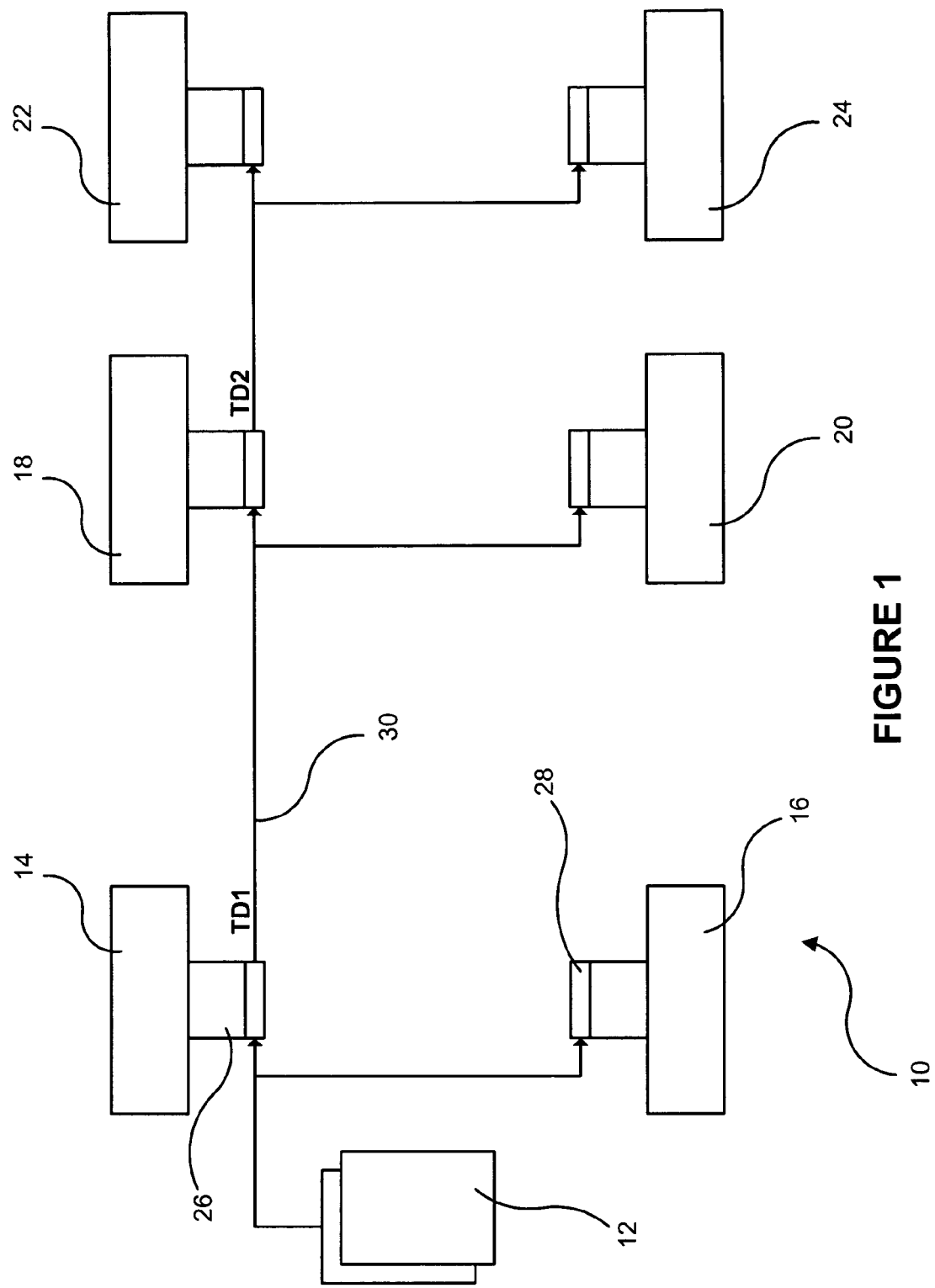
FIG. 1 is a schematic view of an electronically controlled braking system in accordance with an embodiment of the present invention.
Figure 2:
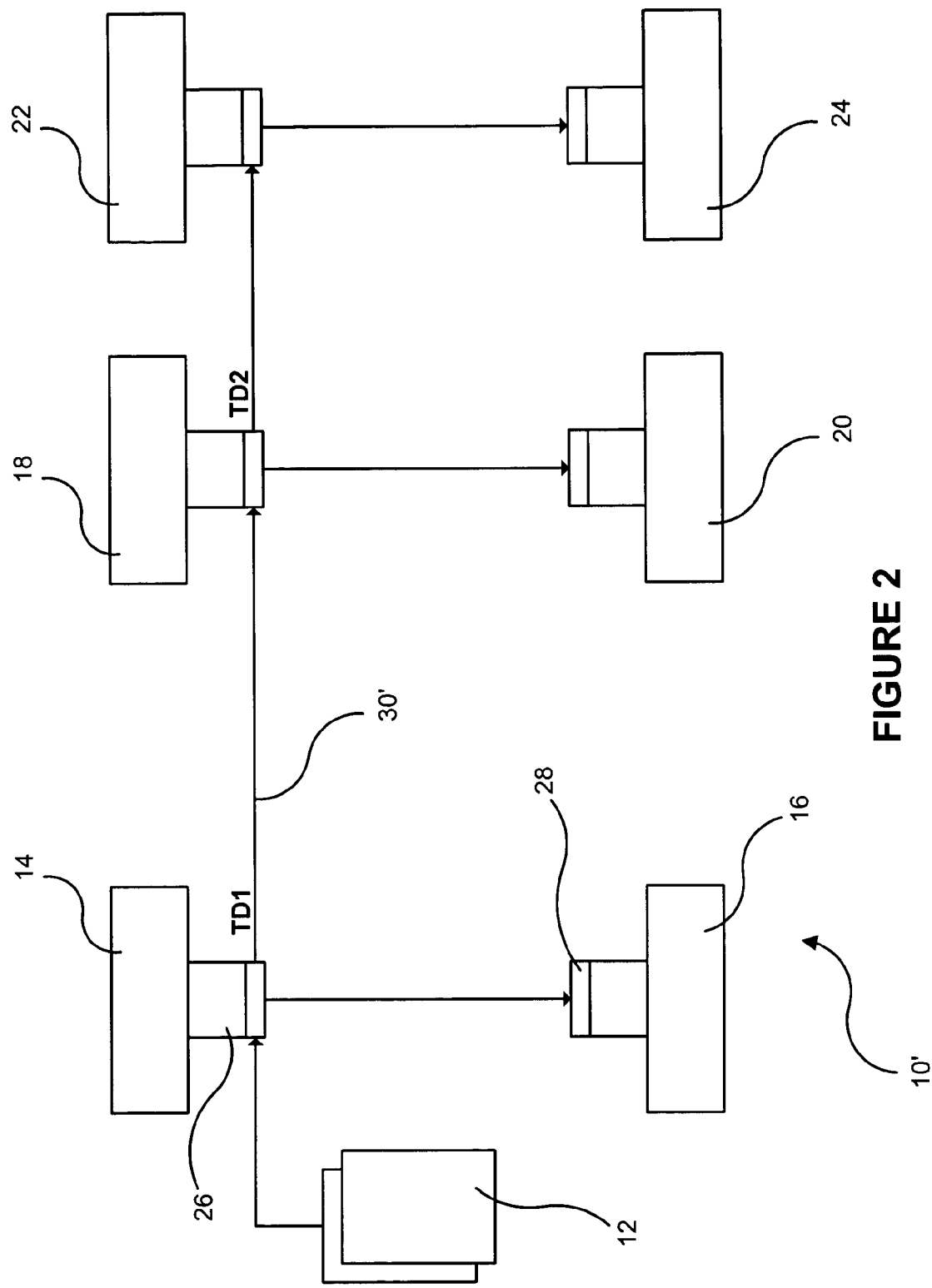
FIG. 2 is a schematic view of an electronically controlled braking system in accordance with another embodiment of the present invention.

Referring to FIGS. 1 and 2, an electronically controlled braking system 10, 10' in accordance with the present invention is shown. Braking system 10, 10' includes at least one central control unit 12 which generates control signals. Braking system 10, 10' also includes a plurality of brake components 14, 16, 18, 20, 22, 24. While six brake components 14, 16, 18, 20, 22, 24 are shown in FIG. 1, it should be understood that braking system 10, 10' may include a greater or lesser number of brake components. It is desirable, although not strictly necessary, that an even number of brake components are provided, and that the brake components are treated as pairs. For example, the brake components associated with the pair of wheels on each axle may be treated as a pair. In FIG. 1, first brake component 14 is paired with second brake component 16, third brake component 18 is paired with fourth brake component 20, and fifth brake component 22 is paired with sixth brake component 24.

Each of brake components 14, 16, 18, 20, 22, 24 is responsive to the control signals generated by control unit(s) 12. More particularly, each of brake components 14, 16, 18, 20, 22, 24 includes a brake actuator 26 incorporating a distributed electronic control unit 28 which distributed electronic control unit 28 causes brake actuator 26 to operate in response to the control signals. As such electronically controllable brake components are known in the art, a detailed discussion of the operation thereof is not presented herein. Each of brake components 14, 16, 18, 20, 22, 24 may be actuated by electrical force, hydraulic force, pneumatic force, combinations of these, and/or by any other appropriate force. Braking system 10, 10' also includes at least one control network 30 for transmitting control signals from control unit(s) 12 to each of brake components 14, 16, 18, 20, 22, 24.

The distributed electronic control unit 28 of each brake component 14, 16, 18, 20, 22, 24 has stored thereon a unique identifier indicative of that brake component's position on the vehicle, and each of the control signals generated by control unit(s) 12 and transmitted over control network 30 includes an identifier indicative of the brake component or components which that particular control signal is intended to control. The distributed electronic control unit 28 of each brake component 14, 16, 18, 20, 22, 24 is only responsive to control signals which include the unique identifier associated therewith. For example, first brake component 14 may be assigned identifier ID1, second brake component 16 may be assigned identifier ID2, third brake component 18 may be assigned identifier ID3, fourth brake component 20 may be assigned identifier ID4, fifth brake component 22 may be assigned identifier ID5, and sixth brake component 24 may be assigned identifier ID6. Each of these identifiers ID1, ID2, ID3, ID4, ID5, ID6 is stored on the distributed electronic control unit 28 of each respective brake component 14, 16, 18, 20, 22, 24. In this example, although the distributed electronic control unit 28 of first brake component 14 would receive all control signals generated and transmitted by central control unit(s) 12, it would be responsive only to control signals which include the identifier ID1. All control signals not including the identifier ID1 would be ignored. Of course, a control signal may include more than one identifier, in which case the distributed electronic control unit 28 of more than one brake component would be responsive thereto.

Identifiers ID1, ID2, ID3, ID4, ID5, ID6 are assigned to and stored on the distributed electronic control unit 28 of each respective brake component 14, 16, 18, 20, 22, 24 automatically by control unit(s) 12. More specifically, at commencement of an identifier assignment routine, identifiers ID1, ID2, ID3, ID4, ID5, ID6 are transmitted by central control unit(s) 12 over control network 30 to each of brake components 14, 16, 18, 20, 22, 24. The determination of which identifier ID1, ID2, ID3, ID4, ID5, ID6 is to be assigned to (i.e., stored on) which brake component 14, 16, 18, 20, 22, 24 is at least partially dependent upon the time it takes identifiers ID1, ID2, ID3, ID4, ID5, ID6 to reach the distributed electronic control unit 28 associated with each brake components 14, 16, 18, 20, 22, 24, such signal travel time being reflective of the position of each brake component 14, 16, 18, 20, 22, 24 on the vehicle.

In the embodiments of system 10, 10' shown in FIGS. 1 and 2, the identifiers ID1, ID2, ID3, ID4, ID5, ID6 are assigned in pairs on a per axle basis, with a time delay TD1, TD2 being introduced at each axle. Of course, it may not be necessary for a time delay to be introduced at the last axle (i.e., the one furthest from central control unit(s) 12 along control network 30), since there are no further identifiers to be assigned after this last axle. It may also be possible that brake components 14, 16, 18, 20, 22, 24 not be treated as pairs (i.e., on a per axle basis), and that they each be connected through control network 30 in series. In this instance, it may be desirable to introduce time delays at each brake component (with the possible exception of the last brake component), rather than at each axle.

Thus, in the embodiments of system 10, 10' shown in FIGS. 1 and 2, central control unit(s) 12 transmits identifiers ID1, ID2, ID3, ID4, ID5, ID6 via control network 30 at the commencement of an identifier assignment routine. The first two identifiers ID1, ID2 are assigned to (i.e., stored on) the distributed electronic control units 28 of first and second brake components 14, 16, and a first time delay TD1 is introduced. After the time delay TD1, the third and fourth identifiers ID3, ID4 are assigned to the distributed electronic control units 28 of third and fourth brake components 18, 20, and a second time delay TD2 is introduced, after which fifth and sixth identifiers ID5, ID6 are assigned to the distributed electronic control units 28 of fifth and sixth brake components 22, 24. The particular manner in which each pair identifiers are assigned to each pair of brake components on each axle may vary, with a different exemplary embodiment being shown in each of FIGS. 1 and 2.

Referring particularly to FIG. 1, the control network 30 of system 10 essentially divides off to each brake component forming each pair of brake components before reaching the distributed electronic control units 28 thereof. For example, it can be seen that control network 30, before reaching the distributed electronic control units 28 of first and second brake components 14, 16, splits off such that identifiers ID1, ID2 are received separately by the distributed electronic control units 28 of and second brake components 14, 16. It can also be seen that the distance the identifiers ID1, ID2 must travel to reach the distributed electronic control unit 28 of second brake components 16 is greater than the distance the identifiers ID1, ID2 must travel to reach the distributed electronic control unit 28 of first brake components 14. As such, identifiers ID1, ID2 reach the distributed electronic control unit 28 of first brake components 14 slightly sooner than they reach the distributed electronic control unit 28 of second brake components 16.

As such, it is known that the identifiers ID1, ID2, ID3, ID4, ID5, ID6 will reach the distributed electronic control unit 28 of first brake components 14 before any others, and ID1 is assigned and stored on the distributed electronic control unit 28 of first brake component 14. It is also known that the identifiers ID1, ID2, ID3, ID4, ID5, ID6 will reach the distributed electronic control unit 28 of second brake components 16 second, and ID2 is assigned and stored on the distributed electronic control unit 28 of second brake component 16. First time delay TD1 is introduced at the first axle (more particularly by the distributed electronic control unit 28 of first brake component 14), before the identifiers ID1, ID2, ID3, ID4, ID5, ID6 are passed on to third, fourth, fifth and sixth brake components 18, 20, 22, 14. Identifiers ID3, ID4 are assigned to third and fourth brake components 18, 20 in a similar manner as identifiers ID1, ID2 were assigned to first and second brake components 14, 16, second time delay TD2 is introduced at the second axle (more particularly by the distributed electronic control unit 28 of third brake component 18), and identifiers ID1, ID2, ID3, ID4, ID5, ID6 are passed on to fifth and sixth brake components 22, 14, to which identifiers ID5 and ID6 are assigned.

The importance of introducing first and second time delays TD1, TD2 will now be discussed. Because identifiers ID1, ID2, ID3, ID4, ID5, ID6 are assigned based upon the order in which they are received by the distributed electronic control unit 28 of each brake component 14, 16, 18, 20, 22, 24, it is important to ensure that the identifiers ID1, ID2, ID3, ID4, ID5, ID6 are received by brake components 14, 16, 18, 20, 22, 24 in the proper temporal sequence (i.e., received first by first brake component 14, received second by second brake component 16, received third by third brake component 18, etc.). If no time delays were introduced, it may be possible for this temporal sequence to become confused. For example, if second brake component 16 and third brake component 18 were located a similar distance from central control unit(s) 12, and first time delay TD1 were not introduced, identifiers ID1, ID2, ID3, ID4, ID5, ID6 may reach second brake component 16 and third brake component 18 at substantially the same time. In this case, system 10 may not be able to properly determine which brake component should be assigned identifier ID2 and which should be assigned identifier ID3. The introduction of first and second time delays TD1, TD2 prevents this from occurring. Of course, the duration of first and second time delays TD1, TD2 should be selected to ensure that the identifiers ID1, ID2, ID3, ID4, ID5, ID6 will always reach the brake components 14, 16, 18, 20, 22, 24 in the proper order under normal operating conditions.

Referring particularly now to FIG. 2, the control network 30' of system 10', rather than dividing off to each brake component forming each pair of brake components before reaching the distributed electronic control units 28 thereof as is the case with system 10 of FIG. 1, is directly connected only to the distributed electronic control unit 28 of one of each pair of brake components. For example, in system 10' it can be seen that control network 30', is directly connected the distributed electronic control unit 28 of first brake component 14, but not to the distributed electronic control unit 28 of second brake component 16.

This embodiment functions in substantially the same way as system 10 shown in FIG. 1, with the exception that the distributed electronic control units 28 of first brake component 14, third brake component 18 and fifth brake component 22 receive identifiers ID1, ID2, ID3, ID4, ID5, ID6 and pass them on to second brake component 16, fourth brake component 20 and sixth brake component 24 respectively, rather than the identifiers ID1, ID2, ID3, ID4, ID5, ID6 being transmitted directly thereto. The timing aspects of system 10', including the introduction of time delays TD1, TD2, are substantially the same as in system 10.

Figure 3:
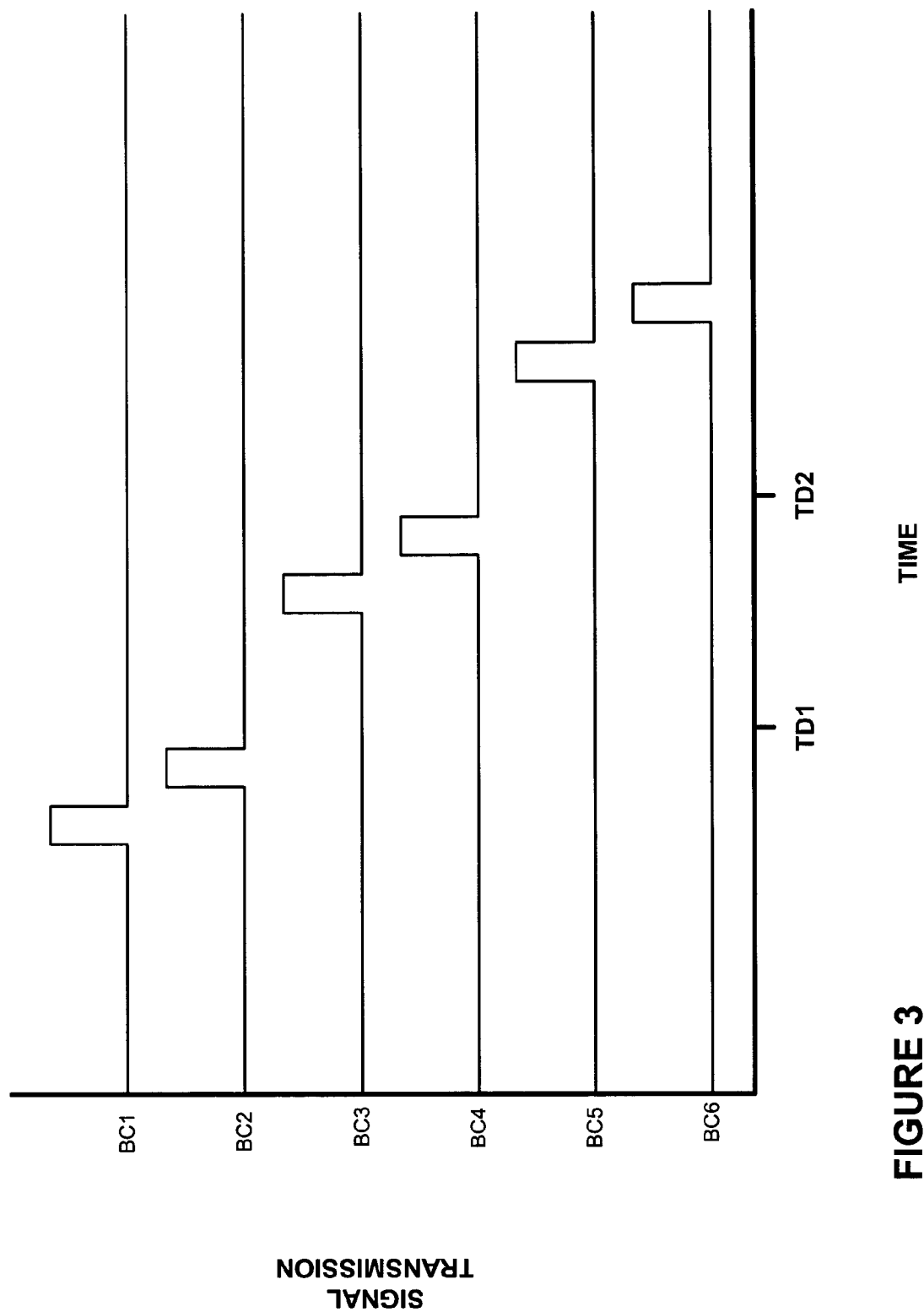
FIG. 3 is a graphical representation illustrating the signal transmission aspect of the electronically controlled braking systems of FIGS. 1 and 2.

The operation of systems 10, 10' is shown graphically in FIG. 3. More specifically, the graph illustrates when identifiers ID1, ID2, ID3, ID4, ID5, ID6 reach each of brake components 14, 16, 18, 20, 22, 24, and further illustrates where first and second time delays TD1, TD2 are introduced. In the graph, first brake component 14 is represented by the line labeled BC1, second brake component 16 is represented by the line labeled BC2, and so on. Thus, by knowing the particular timing when each of the six identifiers ID1, ID2, ID3, ID4, ID5, ID6 reaches each of the six brake components 14, 16, 18, 20, 22, 24, identifier assignments can be easily made.

Rather than central control unit 12 unilaterally assigning identifiers ID1, ID2, ID3, ID4, ID5, ID6 to each of brake components 14, 16, 18, 20, 22, 24, identifiers ID1, ID2, ID3, ID4, ID5, ID6 may be assigned based upon bi-lateral communications between central control unit 12 and the distributed electronic control unit 28 of each brake component 14, 16, 18, 20, 22, 24. In one preferred embodiment, an electronic startup signal is transmitted by central control unit 12 at vehicle startup, periodically or from time to time thereafter and/or upon the occurrence of certain events (as described more fully above and below). This startup signal activates (e.g. "wakes up") the distributed electronic control unit 28 of each brake component 14, 16, 18, 20, 22, 24.

When the distributed electronic control units 28 of first and second brake components 14, 16 (i.e., the brake components on the first axle) receive the startup signal they will "listen" to the communication on the control network 30 (at this stage listening only for the central control unit 12 asking for the distributed electronic control units 28 of the brake components 14, 16, 18, 20, 22, 24 to reply), and if no other brake components are detected on the control network 30 they will know that they are to be assigned ID1 and ID2 respectively in the system and the will then reply the central control unit 12 indicating such.

After a defined time delay TD1 the startup signal will be sent on to the distributed electronic control units 28 of the third and fourth brake components 18, 20 (i.e., the brake components on the second axle). When third and fourth brake components 18, 20 "listen" to the communication on control network 30, they will determine that there are brakes named ID1 and ID2 replying to the central control unit 12 on the control network 30. As such, they will then assign themselves ID3 and ID4 respectively and reply to the central control unit 12 indicating such.

After a defined time delay TD2 the startup signal will be sent on to the distributed electronic control units 28 of the fifth and sixth brake components 22, 24 (i.e., the brake components on the third axle). When fifth and sixth brake components 22, 24 "listen" to the communication on control network 30, they will determine that there are brakes named ID1, ID2, ID3 and ID4 replying to the central control unit 12 on the control network 30. As such, they will then assign themselves ID5 and ID6 respectively and reply to the central control unit 12 indicating such. This process is repeated for any further brake components attached to control network 30.

As discussed above, identifiers ID1, ID2, ID3, ID4, ID5, ID6 are assigned at commencement of an identifier assignment routine. This preferably occurs when the vehicle's ignition system is activated at vehicle start up. However, the identifier assignment routine may additionally be commenced periodically or from time to time thereafter, or upon the occurrence of a particular event. For example, the identifier assignment routine may be commenced when it is sensed that a brake component is added to or removed from the vehicle, such as during servicing, or it may be commenced when a trailer having brake components is added to or removed from the control network 30.

In addition to controlling standard braking operations, control unit(s) 12 may control various additional braking functions, such as antilock brake systems (ABS) and electronic braking force distribution (EBV) systems, as well as other vehicle systems, such as vehicle suspension and dynamic stability systems. In such cases, these additional vehicle systems may have identifiers associated therewith as described above. Moreover, the startup signal discussed above can be replaced by a simple "single wire network" and be additionally used for a gradual parking brake application. The advantage of this is that the system then has an independent (i.e., isolated from the control network 30) way of applying a parking brake condition, which results in a safer system architecture.

The present invention, therefore, provides an electronically controlled braking system intended for use with wheeled vehicles which incorporates distributed electronic control units, which allows for the control of each individual brake component or each group of brake components associated with each distributed electronic control unit independently of those associated with other distributed electronic control units, which allows for control signals intended for controlling only one brake component or group of brake components to be differentiated from those control signals intended for controlling another brake component or group of brake components, which does not require that the distributed electronic control unit be manually programmed or reprogrammed each time a distributed electronic control unit is replaced and/or its location in the system is changed, and which employs an identification scheme, the implementation of which is not time-consuming and/or does not require additional knowledge on the part of service technicians who service the brake system.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An electronically controlled braking system comprising:
    at least one central control unit, said at least one central control unit operable to assign identifiers during an identifier assignment routine;
    a first distributed electronic control unit;
    a second distributed electronic control unit;
    a control network electrically connecting said at least one control unit, said first distributed electronic control unit and said second distributed electronic control unit; and
    wherein the identifiers comprise a first identifier and a second identifier, and wherein one of the first identifier or the second identifier is assigned to said first distributed electronic control unit and the other of the first identifier or the second identifier is assigned to said second distributed electronic control unit at least in part based upon the timing of a signal reaching, via said control network, said first distributed electronic control unit and said second distributed electronic control unit.

2. The system of claim 1:
    wherein said control network electrically connects said at least one control unit with said first distributed electronic control unit, and said second distributed electronic control unit with said first distributed electronic control unit, and
    wherein after the signal is received by said first distributed electronic control unit, said first distributed electronic control unit introduces a time delay before relaying the signal to said second distributed electronic control unit.

3. The system of claim 1:
    wherein said at least one central control unit further generates control signals during operation, each control signal including at least one identifier;
    wherein said control signals are received by said first distributed electronic control unit and said second distributed electronic control unit; and
    wherein each control signal is acted upon by said first distributed electronic control unit only if that control signal includes the identifier assigned to said first distributed electronic control unit and each control signal is acted upon by said second distributed electronic control unit only if that control signal includes the identifier assigned to said second distributed electronic control unit.

4. The system of claim 1 wherein each of the identifiers is indicative of the position of a brake component on a vehicle.

5. The system of claim 1 wherein the identifier assignment routine is performed when a vehicle is first started.

6. The system of claim 1 wherein the identifier assignment routine is performed periodically or from time to time.

7. The system of claim 1 wherein the identifier assignment routine is performed when said central control unit senses that a distributed electronic control unit has been added to or removed from said control network.

8. The system of claim 1 wherein said first distributed electronic control unit and said second distributed electronic control unit are associated with brake components which are actuated by a force selected from the group consisting of an electrical force, a hydraulic force, a pneumatic force and combinations of these.

9. An electronically controlled braking system comprising:
    at least one central control unit, said at least one central control unit operable to assign identifiers during an identifier assignment routine;
    a first pair of distributed electronic control units;
    a second pair of distributed electronic control units;
    a control network electrically connecting said at least one control unit, said first pair of distributed electronic control units, and said second pair of distributed electronic control units; and
    wherein the identifiers comprise a first identifier, a second identifier, a third identifier and a fourth identifier, and wherein one of the first identifier, the second identifier, the third identifier or the fourth identifier is assigned to each of the distributed electronic control units at least in part based upon the timing of a signal reaching, via said control network, each of the distributed electronic control units.

10. The system of claim 9:
    wherein said control network electrically connects said at least one control unit with said first pair of distributed electronic control units, and said second pair of distributed electronic control units with said first pair of distributed electronic control units, and
    wherein after the signal is received by said first pair of distributed electronic control units, said first pair of distributed electronic control units introduces a time delay before relaying the signal to said second pair of distributed electronic control units.

11. The system of claim 10:
    wherein the signal is received by said first pair of distributed electronic control units, and the first identifier is assigned to one of said first pair of distributed electronic control units and the second identifier is assigned to the other one of said first pair of distributed electronic control units; and
    wherein after the time delay, the signal is received by said second pair of distributed electronic control units, and the third identifier is assigned to one of said second pair of distributed electronic control units and the fourth identifier is assigned to the other one of said second pair of distributed electronic control units.

12. The system of claim 9 wherein said first pair of distributed electronic control units is associated with brake components disposed on a first axle of a vehicle and wherein said second pair of distributed electronic control units is associated with brake components disposed on a second axle of the vehicle.

13. The system of claim 9:
   wherein said at least one central control unit further generates control signals during operation, each control signal including at least one identifier;
   wherein the control signals are received by each of the distributed electronic control units; and
   wherein each control signal is acted upon by each distributed electronic control unit only if that control signal includes the identifier assigned to that distributed electronic control unit.

14. The system of claim 9 wherein each of the identifiers is indicative of the position of a brake component on a vehicle.

15. The system of claim 9 wherein the identifier assignment routine is performed when a vehicle is first started.

16. The system of claim 9 wherein the identifier assignment routine is performed periodically or from time to time.

17. The system of claim 9 wherein the identifier assignment routine is performed when said central control unit senses that a distributed electronic control unit has been added to or removed from said control network.

18. The system of claim 9 wherein said first pair of distributed electronic control units and said second pair of distributed electronic control units are associated with brake components which are actuated by a force selected from the group consisting of an electrical force, a hydraulic force, a pneumatic force and combinations of these.

19. A method of operating an electronically controlled braking system, said method comprising the steps of:
   transmitting a signal from a central control unit to a first distributed electronic control unit and a second distributed electronic control unit; and
   assigning one of a first identifier or a second identifier to the first distributed electronic control unit and assigning the other of the first identifier or the second identifier to the second distributed electronic control unit at least in part based upon the timing of the signal from the central control unit reaching the first distributed electronic control unit and the second distributed electronic control unit.

20. The method of claim 19:
   wherein the signal is transmitted to the second distributed electronic unit through the first distributed electronic control unit, and
   further comprising the step of introducing a time delay in the first distributed electronic control unit before relaying the signal to the second distributed electronic control unit.

21. The method of claim 19 further comprising the steps of:
   generating control signals during operation, each control signal including at least one identifier;
   receiving the control signals with the first distributed electronic control unit and the second distributed electronic control unit;
   acting upon the control signals with the first distributed electronic control unit only if that control signal includes the identifier assigned to the first distributed electronic control unit; and
   acting upon the control signals with the second distributed electronic control unit only if that control signal includes the identifier assigned to the second distributed electronic control unit.

22. The method of claim 19 wherein each of the identifiers is indicative of the position of a brake component on a vehicle.

23. The method of claim 19 wherein said transmitting and assigning steps are performed when a vehicle is first started.

24. The method of claim 19 wherein said transmitting and assigning steps are performed periodically or from time to time.

25. The method of claim 19 wherein said transmitting and assigning steps are performed when a distributed electronic control unit has been added to or removed from the braking system.

26. A method of operating an electronically controlled braking system, said method comprising the steps of:
   transmitting a signal from a central control unit to a first pair of distributed electronic control units and a second pair of distributed electronic control units; and
   assigning one of a first identifier, a second identifier, a third identifier or a fourth identifier to each of the distributed electronic control units at least in part based upon the timing of the signal from a central control unit reaching each of the distributed electronic control units.

27. The method of claim 26:
   wherein the signal is transmitted to the second pair of distributed electronic units through at least one of the first pair of distributed electronic control units, and
   further comprising the step of introducing a time delay with the at least one of the first pair of distributed electronic control units through which the signal is transmitted before relaying the signal to the second pair of distributed electronic control units.

28. The method of claim 27 wherein said assigning step comprises the steps of:
   receiving the signal with the first pair of distributed electronic control units, assigning the first identifier to one of the first pair of distributed electronic control units, and assigning the second identifier to the other one of the first pair of distributed electronic control units; and
   receiving, after the time delay, the signal with the second pair of distributed electronic control units, assigning the third identifier to one of the second pair of distributed electronic control units, and assigning the fourth identifier to the other one of the second pair of distributed electronic control units.

29. The method of claim 26 wherein the first pair of distributed electronic control units is associated with brake components disposed on a first axle of a vehicle and wherein the second pair of distributed electronic control units is associated with brake components disposed on a second axle of the vehicle.

30. The method of claim 26 further comprising the steps of:
   generating control signals during operation, each control signal including at least one identifier;
   receiving the control signals with the distributed electronic control units; and
   acting upon each control signal only with the distributed electronic control unit or units which have been assigned an identifier which matches the at least one identifier included in the control signal.

31. The method of claim 26 wherein each of the identifiers is indicative of the position of a brake component on a vehicle.

32. The method of claim 26 wherein said transmitting and assigning steps are performed when a vehicle is first started.

33. The method of claim 26 wherein said transmitting and assigning steps are performed periodically or from time to time.

34. The method of claim 26 wherein said transmitting and assigning steps are performed when a distributed electronic control unit has been added to or removed from the braking system.

* * * * *